United States Patent
Montagner

[11] Patent Number: 6,161,254
[45] Date of Patent: Dec. 19, 2000

[54] DEVICE, PARTICULARLY REDUCED, FOR THE ELASTICIZING OF AN EAR-PIECE FOR SPECTACLES

[76] Inventor: Luciano Montagner, Viale Italia, 16, Segusino, Italy, I-31040

[21] Appl. No.: 09/171,973
[22] PCT Filed: Apr. 18, 1997
[86] PCT No.: PCT/IT97/00088
  § 371 Date: Oct. 29, 1998
  § 102(e) Date: Oct. 29, 1998
[87] PCT Pub. No.: WO97/41482
  PCT Pub. Date: Nov. 6, 1997

[30] Foreign Application Priority Data

Apr. 29, 1998 [IT] Italy ................................ TV96A0056

[51] Int. Cl.[7] ........................................... G02C 5/22
[52] U.S. Cl. .............................. 16/228; 16/281; 351/113; 351/153
[58] Field of Search ............................. 16/228, 286, 281, 16/277, 50; 351/113, 153, 121, 119

[56] References Cited

U.S. PATENT DOCUMENTS

| | | | |
|---|---|---|---|
| 4,747,183 | 5/1988 | Drlik | 16/228 |
| 4,991,258 | 2/1991 | Drlik | 16/228 |
| 5,402,552 | 4/1995 | Chen | 16/228 |
| 5,406,339 | 4/1995 | Chen | 16/228 |
| 5,755,010 | 5/1998 | Lehnert | 16/228 |

FOREIGN PATENT DOCUMENTS

| | | |
|---|---|---|
| 462936A1 | 6/1991 | European Pat. Off. . |
| 2097211 | 5/1970 | France . |
| 2948113A1 | 11/1979 | Germany . |
| WO 96/29623 | 9/1996 | WIPO . |

*Primary Examiner*—Chuck Y. Mah
*Attorney, Agent, or Firm*—Wenderoth, Lind & Ponack, L.L.P.

[57] ABSTRACT

An ear-piece assembly for connecting an earpiece to a spectacle frame. The ear-piece assembly having a box with an opening in a hinging side wall. A tie-rod hinge having first and second hinge ends and a center portion located between the first and second hinge ends, the first hinge end having at least one wing and being located inside the box and the second hinge end being located outside the box, the tie-rod hinge is slidable through the opening in the hinging side wall. The ear-piece assembly also having at least one spring with first and second spring ends and being located inside the box, the at least one spring is not surrounding the tie-rod hinge, and the first spring end is in abutment with the hinging side wall of the box and the second spring end is in abutment with the at least one wing.

3 Claims, 2 Drawing Sheets

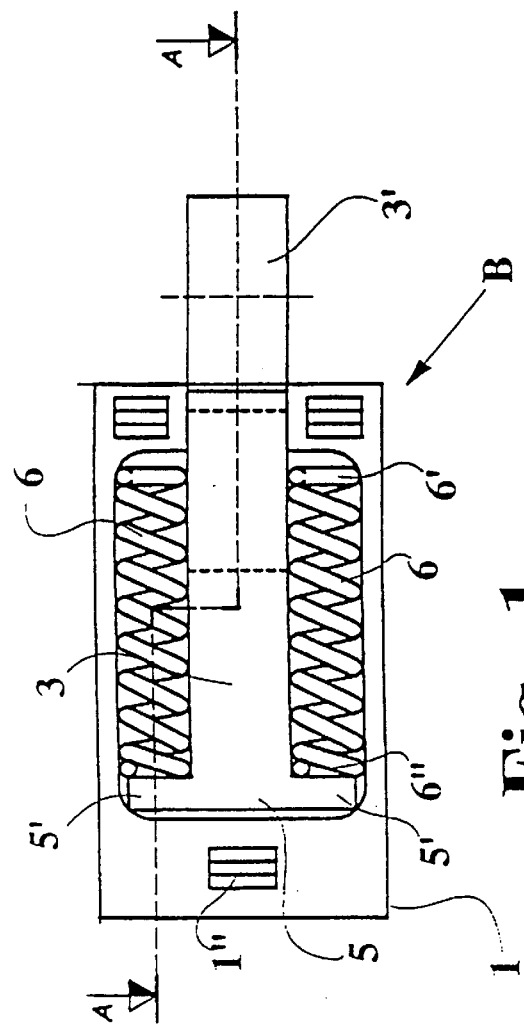
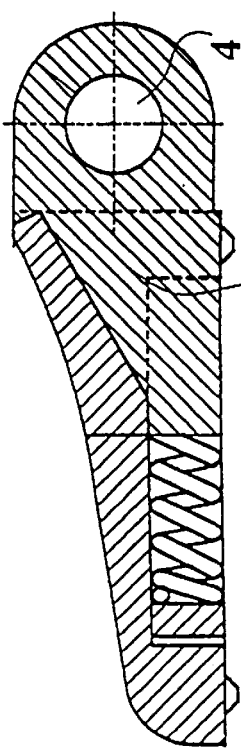
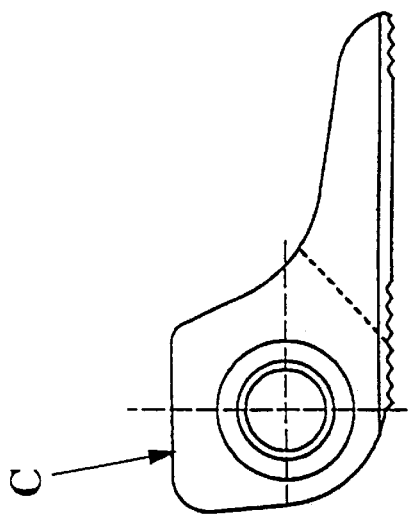

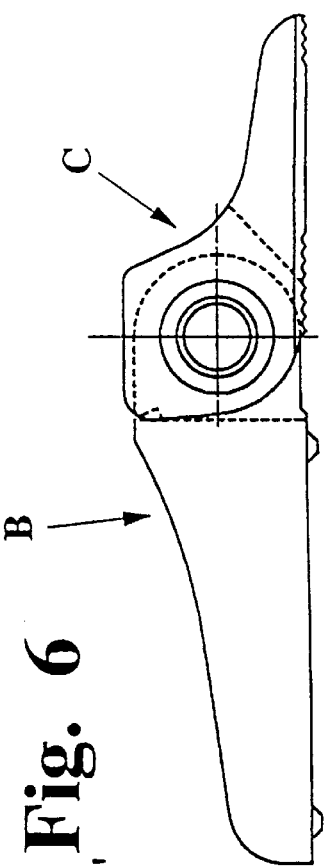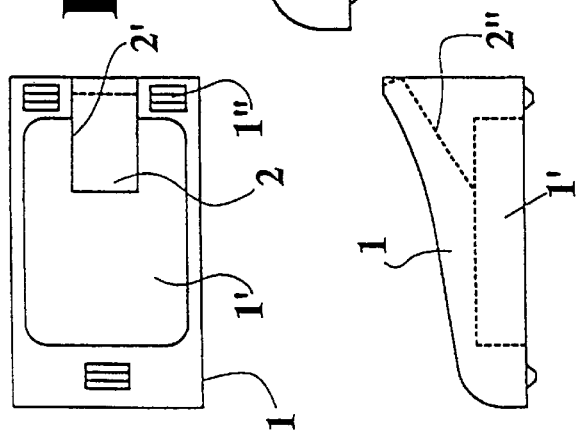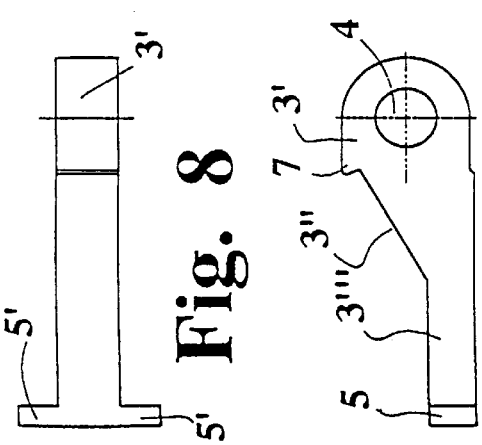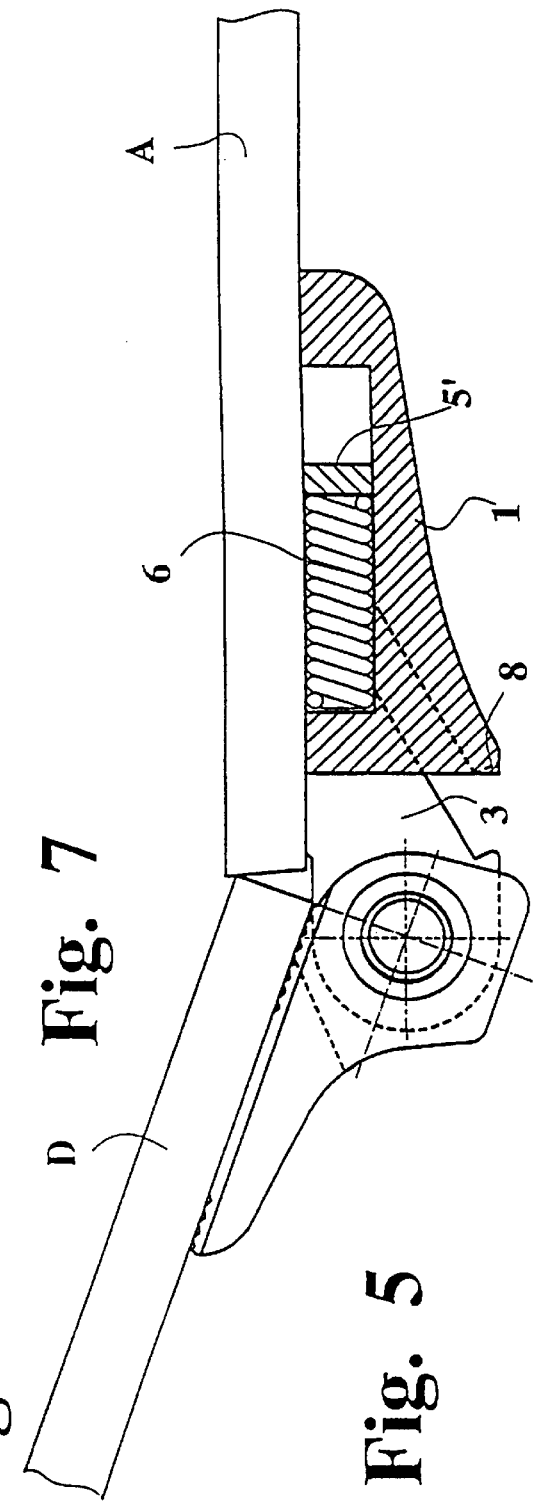

DEVICE, PARTICULARLY REDUCED, FOR THE ELASTICIZING OF AN EAR-PIECE FOR SPECTACLES

BACKGROUND OF THE INVENTION

1. Technical Field

The object of this invention is a device, particularly reduced in size, for the elasticizing of an ear-piece for spectacles. The innovation finds particular, if not exclusive, application in the field of spectacles production, including small metal parts and their fittings.

2. Background Art

Many frames for spectacles are known in the prior art. Some of these frames have devices located close to their hinging for allowing the elastic fastening of ear-pieces to a part of the frame which is known as a front face (WO 9629623A (IDEAL srl Montagner Luciano)). Having such a device located on both sides of the spectacles has the advantage of giving a better fit, because if the ear-pieces exert a low pressure on a person's temples, they are easier to endure by most people, and the spectacles are more adaptable to the different anatomical shapes of each subject. Therefore, the firms in this field are constantly attempting to find innovative and improved solutions, both with regard to function and size of the devices, when compared to the preexisting devices.

For example, a traditional elasticized ear-piece, that found wide acceptance among consumers is disclosed in the European patent application n.79400087.7, in which an elastic hinge was described for a spectacles frame. The elastic hinge comprises a box associated sideways to the ear-piece, the box containing a tie-rod coaxial to the box, and in which an end portion of the tie-rod is threaded, on which is screwed a bushing that ensures the positioning of a spring, while the other side of the tie-rod is in abutment on the inside of a seat in the box.

Another system, conceptually based on the solution provided by the previous patent application disclosure, is disclosed in the Italian utility model n.181221, which has an improved hinge for the articulation of a spectacles frame with an elastically openable ear-piece. A squared support is provided in the frame, on which is inserted a support which is also squared that makes up a shoulder for the compression of a spring.

Finally, the Italian Patent n. 1 147 198 discloses an ear-piece with elastic hinging in which an end of the ear-piece has an axially holed small block within which is inserted one end for the connection of the hinge. Continuing with a reduced diameter, it supports a sharp edge that is fixed inside the borehole while on the back of the borehole is a tension helicoidal spring blocked at an end by a threaded locknut. In such a case, it is possible for the elastic opening of the ear-piece to achieve a certain angle by an elastic yielding of the hinge-like connection.

The common drawbacks noticed in the above-mentioned solutions include excessive complexity of the utilized devices and a total oversizing of the device. Furthermore, notwithstanding that the above-mentioned devices may perform their functions perfectly, they have many problems during the execution phase, such as the manufacturing of the many precision components, as well as during their assembly, each considerably influencing the manufacturing time and cost. Therefore, a main purpose of the firms of the field, has been to obtain elasticizing devices for ear-pieces that are smaller in size, offer good functionality while at the same time reducing the number of components, and decrease the assembly time and costs.

In the numerous recent devices on the market that are more or less effective and in line with the above mentioned principles, there is a solution in which the articulation is an ear-piece with a sliding body containing an elasticizing spring. In more detail, the body, has a square cross section, in which some material has been removed longitudinally from one part of the body to another to obtain opposite thin sheets which define a guide seat, and make up containing walls of a spring. On one side, the spring is placed in abutment on the seat, while on the other, the spring is fastened to a tooth which protrudes outward with respect to the profile defined by the sliding body. Also, the device has a half-hull, is opened on one side and is associated with an ear-piece, and on the inside of the half-hull the sliding body including the spring, is inserted. As a result, the tooth on the longitudinal surface acts as a stop reference. In a traction condition, the articulation causes the body to slide on the inside of the half-hull while causing the tooth to constantly grip along the base of the half-hull to compress the spring, and therefore recall elastically the articulation itself.

It is also very common to fasten to the box, preassembled, on the end of the ear-piece, an elastic yielding group consisting of an articulation on which is screwed a tie-rod coaxial to a spring and fastened on the opposite side by a suitable bushing. As a result, it is possible to notice at least two drawbacks, the need for an adequate size, which influences the weight of the structure, aesthetic not excluded, and the use of screws involve considerable assembling time, and therefore considerable costs. For some ear-pieces, this device is considered valuable and the system is still valid, as seen by its wide use, but for the others, directed to a wider public, the device would not be any more convenient, because of the high costs of the frame. Continuous research in the field, in recent years, was therefore directed towards alternative devices, designed for being produced in great quantities and mainly able to obviate the use of the spring passing the box for the fastening of the elastic yielding group.

It is also known that the French Patent n. 2 517 080 describes a hinge for a spectacles frame, in which a metal core is one with the articulation hinged to the front face. The core is placed, passing from one side to the other, coaxial to a box, and near one end of the box, a housing is provided that is able to contain a helicoidal compression spring. One side of the helicoidal compression spring is positioned in abutment to an annular edge obtained through a working internal to the box, and the other side of the helicoidal compression spring is positioned on the end partially inserted inside the box and which covers the end of the core. The effect obtained by opening the era-piece, consists of the coaxial sliding of the end with respect to the box containing the device. The drawbacks of this latter solution include the fact that some complex components are still required, which make manufacturing and assembling particularly difficult, not excluding some manufacturing costs which would considerably affect the finished product.

Also in the prior art are other known improved elastic yielding devices, which are derived more or less from the previously described solutions, and which exhibit some of the problems related to the large size of the articulation. For example, a two spring ear-piece hinging device is disclosed in EP-A-0462936. It has a double tie-rod spring guide, surrounded by respective helical springs.

The fact is that elasticizing devices are particularly bulky, and unpleasant to see because the ear-piece shape limits and conditions the device's application. Another negative aspect commonly noticeable in the above-mentioned solutions, includes the fact that it is not possible to combine the already finished device directly with the ear-piece and instead involve rather long assembling times. Finally, the traditional ear-pieces have a tie-rod which, because of its shape, allows for excessive slack being inclined as a torsion, that is not much liked by the consumer. The purpose of this invention is to obviate the mentioned drawbacks.

SUMMARY OF THE INVENTION

This and other purposes are reached with the present invention which solves the above-mentioned problems by using a device for the elasticizing of an ear-piece for glasses, comprising a preassembled small box combined to an ear-piece by means of spot-welding. Inside the small box are housed two springs, the springs each having one end in abutment on the bottom of the small box, and the other end being placed in abutment with the end of a respective tie-rod. The tie-rods are substantially "T" shaped, each having the end opposite to the respective spring provided with a hole to be hingeable connected to a corresponding small front face provided on the frame of the spectacles.

In such way, through considerable creative contribution and whose effect represents immediate technical progress, many advantages are obtained. First, a substantial reduction of size, mainly with regard to length, is obtained. Besides having a considerable aesthetic advantage, the invention allows for the widening of the range of tie-rods on which the device can be used. A second important advantage is that because of the particular "T" like shape of the tie-rod, negative slacks, mainly torsion ones, very common in the linear single-tie rods are avoided, diminishing component wear. These slacks may cause stress of the parts of the spectacles, giving a feeling of discomfort to the wearer. With regard to production of the device, an advantage is that the device is completed before being combined with the ear-piece, and therefore, combined to the ear-piece with a substantial reduction of manufacturing time and cost.

In conclusion, there will be a considerable functionality-price ratio benefit, making possible the use of the elastic yielding device in a great number of spectacles, thus widening the base of possible consumers.

These and other advantages will appear from the following detailed description of preferred embodiments with the aid of the enclosed schematic drawings whose execution details are not to be considered as restrictive, but only as examples.

BRIEF DESCRIPTION OF THE DRAWINGS

FIG. 1 represents a total view as seen from an open side of a small box of a main part of an elastic yielding device, to be combined with a corresponding tie-rod;

FIG. 2 represents a longitudinal section view of the device of FIG. 1 seen respectively along the axis A—A;

FIG. 3 is a top view of small front face to be attached to the spectacles frame of the device of the previous Figures;

FIG. 4 represents a top and a total view of the elastic yielding device complete with the small front face;

FIG. 5 represents always a top and partially section view of the device of the previous Figures in use on spectacles;

FIGS. 6 and 7, respectively, represent a lower view and a side view of the small box, as a part of the elastic yielding device;

FIGS. 8 and 9 represent views taken on two sides of a tie-rod provided with a "T" like shaped end.

DETAILED DESCRIPTION OF THE INVENTION

Referring to the figures, it can be seen that at least one ear-piece (A), particularly for spectacles, is elastically yielding for allowing, when the spectacles are worn, the opening of the ear-pieces beyond the common opening axis which is generally perpendicular with respect to a frame (D). In more detail, each metal ear-piece (A) of the spectacles, provides as combined on a flat side, and in correspondence with one end, an elastic yielding device (B), which interacts with a small front face (C), and in turn is engaged with the spectacles frame (D). The elastic yielding device (B) consists of a small box (1), having a rather contained size, and an open side (1') on a fixing side on the corresponding tie-rod (A). Along a perimetrical edge of the small box (1), always on the open side (1'), are provided three coplanar teeth of exceeding material (1"), two coplanar teeth in the front part and only one in the back part. The teeth (1"), following a cycle of spot welding by electro-welding and melting with the part of the ear-piece (A) concerned, allow for the definite and steady fastening of the small box (1). A second characteristic of the small box (1), is that a longitudinal opening (2) is provided on a hinging side wall and which has an edge in correspondence with the front part, and which creates perpendicular side walls (2') with respect to a surface with an oblique base (2"). The purpose of the opening (2), is to be the axial guide of a tie-rod (3), the tie-rod being in part housed inside of the small box (1), and in part protruding from the small box (1) through a flat surface (3') that is to be hinged to the small front face (C) of the spectacles (D). The part (3') of the tie-rod (3) provides a rounded end and a central hole (4) for the hinging to the small front face (C), while on the opposite side of the tie-rod, it is possible to see a progressive tapering, obtained from an oblique side (3"), which copies the guide's shape (2) in the small box (1). The tie-rod (3) has a straight shape (3'") which joins the hinging front part (3') with a transversal striker (5). The transversal striker (5) is obtained monolithically from the tie-rod (3) and is constructed of two wings (5') which are opposite and perpendicular to the section (3'") defining two lateral housings, resulting in the division of the small box into sections, each of which comprises an helicoidal spring (6). In even more detail, the springs (6) are on both sides of the tie-rod (3), and are placed with one end (6') in abutment with the bottom of the front part of the small box (1), while the opposite ends (6") are in abutment with the corresponding wings (5').

In a possible variation, the end shape of the tie-rod (3), instead of having a shape similar to a "T", can have an "L" like shape (not shown), with only one of the winds protruding perpendicularly to the tie-rod. In such a case, the housing obtained on the side of said tie-rod (3) will allow for only one spring (6) rather than for two. In a variation similar to this last case, the tie-rod (3) can be misaligned with respect to a middle position, and instead be longitudinally movable near an internal side of the small box (1), which allows for an increase in the width of the space which contains the single spring (6).

In order to keep the springs (6) in slight tension while in a rest position to avoid any slack relative to the tie-rod (3), a hook (7) is provided just before the beginning of the oblique side (3") of the tie-rod (3). The function of this hook (7) while the device is in a static condition with the springs (6) extended, is that the hooks stops on the abutment (8) provided in the manufacturing of the small box (1) and corresponding to the guide entrance (2). During the assembling phase, it is therefore possible to insert into the small box (1), first the tie-rod (3) and then the springs (6), or both the tie-rod (3) and the springs (6) at the same time, which will result in slightly pre-charging the springs (6) in their respective housings.

By exerting an axial traction of the tie-rod (3), a condition equivalent to the opening of the ear-piece (A) beyond the common opening angle is obtained, resulting in a compression of both springs (6), which contrasts action. As a consequence, the ear-piece (A) hinged to a corresponding front face (C), yields elastically with respect to the front part of the frame (D), pulling the tie-rod (3) and at the same time compressing the springs (6) which are pushed internally against the shoulder of the front part of the small box (1).

Thus, the natural extension of the springs (6) allows the spectacles to be properly and softly worn by modulating the pressure exerted by the ear-pieces on the temples, and then, when the spectacles are no longer being used, allows the ear-pieces to return to a static condition.

What is claimed is:

1. An ear-piece assembly for connecting an earpiece to a spectacle frame, the ear-piece assembly comprising:

a box comprising a hinging side wall having an opening;

a tie-rod hinge having first and second hinge ends and a center portion located between said first and second hinge ends, said first hinge end having two wings and being substantially "T" shaped and being located inside said box and said second hinge end being located outside said box, said tie-rod hinge being slidable through said opening in said hinging side wall; and two springs having first and second spring ends and being located inside said box, and wherein said first spring ends are in abutment with said hinging side wall of said box and said second spring ends are in abutment with a respective one of said two wings.

2. An ear-piece assembly claimed in claim 1, wherein said center portion of said tie-rod hinge comprises a straight section and an oblique section, said straight section is adjacent to said first hinge end and said oblique section is adjacent to said second hinge end such that said tie-rod hinge forms a lateral housing for each of said two springs.

3. An ear-piece assembly claimed in claim 1, wherein said two springs are on opposite sides of said tie-rod.

* * * * *